FIG. I 3,689,324
PROCESS FOR OBTAINING PREFERRED ORIENTATION IN ZIRCONIUM AND ITS ALLOY
George W. Wiener, 2348 Marbury Road, Pittsburgh, Pa. 15221; William T. Reynolds, 109 Scenery Circle, McMurray, Pa. 15317; and Robert G. Aspden, R.D. 1, Flagstaff Drive, Export, Pa. 15632
Filed Sept. 27, 1968, Ser. No. 763,298
Int. Cl. C22f 1/18; C22c 15/00
U.S. Cl. 148—11.5
18 Claims

ABSTRACT OF THE DISCLOSURE

A process is described in which zirconium and its alloys are subjected to a beta phase heat treatment and during said heat treatment a surface active agent is admitted to the heat treating environment. Thereafter, the metal or alloy is cooled to a temperature below the allotropic transformation temperature. The metal or alloy thus treated is characterized by a preferred orientation which includes a high volume proportion of the grains exhibiting the basal plane (0002) oriented to within 15° of the surface of the material.

---

The invention herein described was made in the course of or under a contract W–7405–Eng–26 Subcontract 2713 with the Atomic Energy Commission.

BACKGROUND OF THE INVENTION

Field of the invention

The present invention relates to a process for obtaining a preferred grain orientation in zirconium and its alloys.

Description of the prior art

Zirconium and its alloys have been conventionally employed in nuclear reactors, for example, as the material which clads the actual fuel. With the present day cycling of nuclear reactors which are employed in the production of electrical power, it is desirable to provide longer core lives, high operating temperatures and greater neutron economy in the total performance of the reactor and its structural materials. While considerable work has been done relating to alloy development programs, the present process relates to the existing zirconium base alloys which are known and used in nuclear fueled reactors. It has been postulated that with a certain preferred orientation or texture, the strength, ductility oxidation resistance and hydride susceptibility of the fabricated pressure tubing and fuel element cladding can be greatly improved. Some work along these lines has been studied with respect to the anisotropy of mechanical proper ties of zircaloy-2.

In the past it has been known, with respect to magnetic materials, that highly developed grain textures can be readily obtained. Conventional methods of texture formation have yielded several useful textures. The (100)[001] texture in iron-nickel alloys resulted from primary recrystallization and normal grain growth. N. P. Goss developed the (110)[001] or cube-on-edge texture in silicon iron by secondary recrystallization. In general, the foregoing texture in iron containing about 3% silicon does not have as great a concentration of low index planes parallel to the rolling plane as the texture obtained by recently developed methods which include the formation of the texture known as (100)[001] or cube-on-face orientation.

More recent methods of texture development involve a selective driving force caused by the anisotropy of free energy at the gas-to-metal interface. Under annealing conditions which permit no surface adsorption, the most densely packed plane has the lowest surface free energy. Other low index planes can be made to have lowest surface free energy by selective absorption of annealing atmosphere additives such as sulfur, for example, in the annealing of iron base alloys. In iron containing about 3% silicon the anisotropy of surface free energy has been used to develop sharp textures with any of the low index planes parallel to the surfcae of the sheet. These textures form by secondary recrystallization.

When iron containing 3% silicon is bright annealed the (110) grains grow at the expense of their neighboring grains provided no surface adsorption of the annealing atmosphere occurs. However the (100) grains can be caused to grow by the addition of 50 p.p.m. of hydrogen sulfide to the annealing atmosphere. It has been hypothesized that under the latter condition the (100) grains have the lowest surface free energy by selective adsorption of sulfur. Since as much as 95% of the grains have the (100) plane within 10° of the rolling plane as a result of the process, this characteristic becomes of particular importance. The technique of surface energy controlled secondary recrystallization has been successfully used on a wide variety of iron base alloys.

A somewhat different surface energy technique has been used to obtain preferred orientations in alloys which undergo a phase change. For example, in iron and iron base alloys sharp textures resulted from surface energy induced preferred nucleation of (100) alpha grains during the gamma-to-alpha transformation. As high as 95% of the sheet surface was occupied by grains having the (100) plane within 12° of the rolling plane.

In accordance with this invention, novel surface energy techniques have been effective in texturing crystal bar zirconium and indicate that such surface energy controlled grain growth of beta-zirconium plus preferred nucleation have combined to yield an alpha-zirconium structure in which the material exhibits a large volume of the grains having the basal plane within 15° of the surface of the material.

SUMMARY OF THE INVENTION

The present invention is concerned with a process for producing zirconium and zirconium base alloy materials which are characterized by exhibiting a selected preferred grain orientation. These materials are characterized by undergoing an alpha to beta phase transformation upon heating and retransforming to alpha phase on cooling, the alpha phase consisting of a close packed hexagonal lattice structure and the beta phase consisting of a body centered cubic lattice structure. The preferred orientation which process of the present invention imparts to the zirconium and zirconium base alloys may be described as an orientation in which a large volume of the grains display an orientation in which the basal plane, that is, the (0002) is within 15° of the surface of sheet. The zirconium material, in any suitable form, is usually hot worked and thereafter given a series of cold working reductions. The cold working may be accomplished in one or more steps with an intermediate heat treatment interposed therebetween. While the zirconium and zirconium base alloy materials to which the process of the present invention relate will exhibit the preferred orientation by proper heat treatment in the presence of a surface active agent, a considerably stronger, well defined texture is obtained where the material has a thickness after final cold reduction, that is, following cold working of the material to final gauge such that the average beta grain diameter approaches or exceeds the material thickness dimension. That is to say the process of the invention preferably utilizes a material which will be cold worked to such prescribed gauge. Thereafter the cold worked material of prescribed gauge is subjected to a heat treatment at a temperature in excess of the beta phase transformation temperature. During this time, the material is maintained within the confines of a protective atmosphere. Such protective atmosphere for example may consist of an inert gas such as helium or argon or in the alternative a vacuum can be employed. During heat treatment at such elevated temperature it is preferred to introduce a critical surface active agent into the protective atmosphere and such surface active agent is maintained within the atmosphere throughout substantially the whole heat treating cycle. Preferably the material is maintained at such elevated temperature for a period of about one hour minimum. Thereafter the material is cooled to some convenient temperature below the allotropic transformation temperature. It has been found that as a result of the process as set forth hereinbefore the zirconium material has exhibited a preferred orientation which measurements, employing X-ray analysis and pole figures, indicate a large percentage by volume of the grains displaying an orientation in which the basal plane (0002) is within 15° of the material specimen surface.

It is an object of the present invention to provide a process for obtaining a preferred orientation in zirconium and zirconium base alloys.

Another object of the present invention is to improve the properties of zirconium and zirconium base alloys by inducing a preferred orientation to the grains.

A more specific object of the present invention is to provide a process for beta annealing zirconium and zirconium base alloys in the presence of a surface active agent and thereafter subjecting the material to an allotropic transformation for developing a preferred orientation.

These and other objects of the present invention will become apparent when read in conjunction with the following description and drawings in which:

DESCRIPTION OF THE PREFERRED EMBODIMENT

Figure 1:
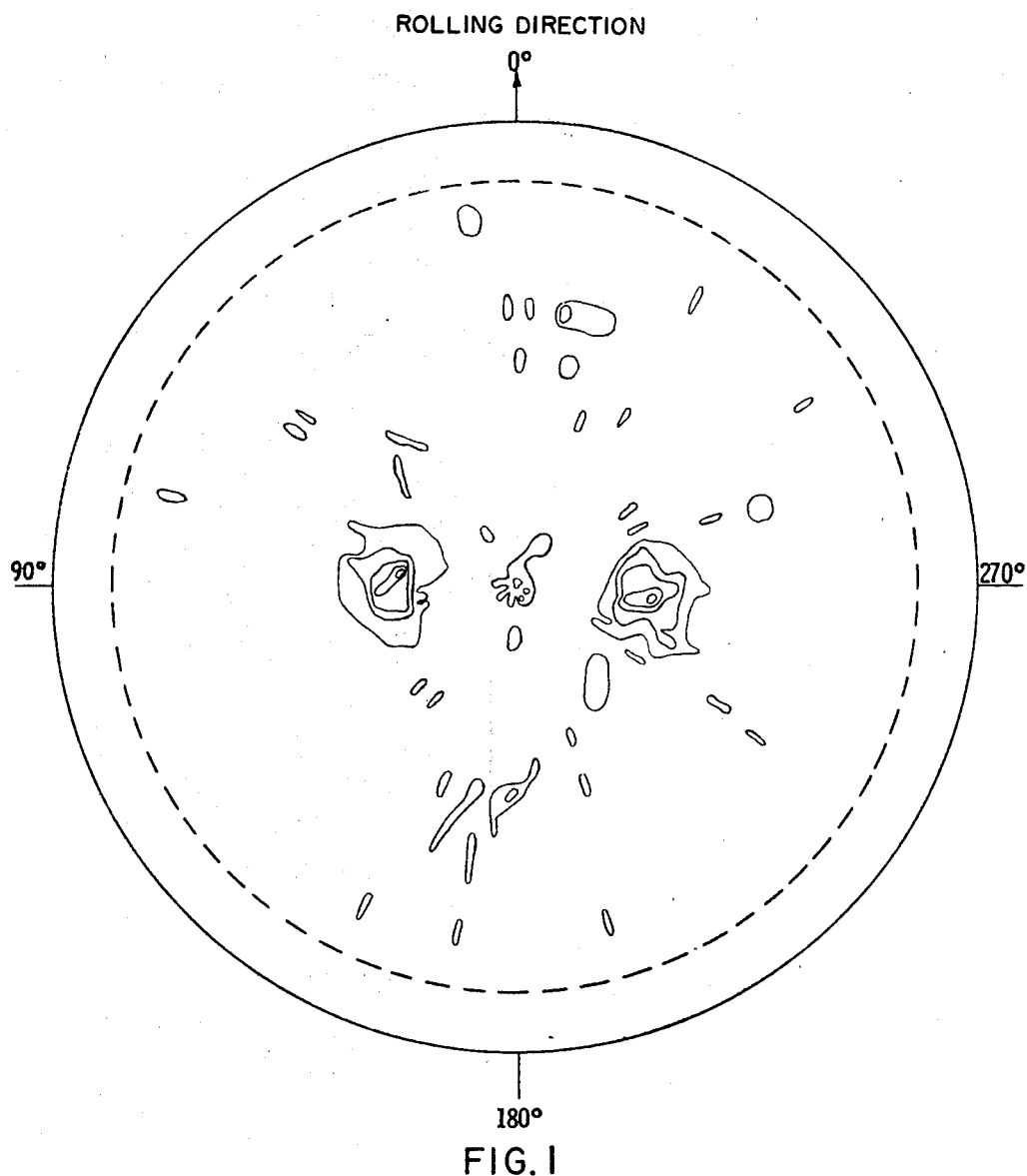
FIG. 1 is a pole figure of crystal bar zirconium sheet cold rolled to 0.010 inch and vacuum annealed for one hour at 1000° C. Contour lines show multiples of random intensity 2, 5, 10, 15 and 20.

The process of the present invention is directed to the production of zirconium and zirconium base alloys in which a selected preferred orientation namely a basal plane (0002) is within 15° of a surface, of a high proportion of the grain volume is present. The zirconium base alloys are those alloys which are characterized by undergoing an alpha to beta transformation, the alpha phase being characterized by a close packed hexagonal system and the beta phase being characterized by a crystalline structure of the body centered cubic lattice configuration. Any of the zirconium base alloys which undergo the beta transformation and in which the alpha base is the stable phase at room temperature are suitable for practicing the process of the present invention.

The zirconium or zirconium base alloy starting material can take any form such as the crystal bar zirconium or sponge zirconium ingots which have been melted usually in a vacuum or a protective atmosphere and preferably employing the consumable electrode vacuum melting equipment. While other types of melting can be employed such as levitation melting or electron beam melting, particular success has been obtained where the material has been utilized in the form of an electrode in a consumable electrode or an electron beam vacuum remelting furnace. The product from any melting operation which produces a homogeneous material is preferred and this product may be hot worked in any of the well known manners, for example, forging, rolling, extruding, pressing, etc. Typically, the ingot may be forged to a convenient billet size at a temperature suitably within the range between about 800° C. and 850° C. and with sufficient reheating taking place so that the material does not cool unduly during working. Preferably, such reheating takes place in an argon atmosphere. In some cases the hot working can be carried out in an inert atmosphere.

When a convenient intermediate size is obtained the billet or slab may be grit blasted, pickled in a solution consisting of 10 parts of hydrofluoric acid, 45 parts nitric acid and 45 parts of water, and thereafter hot rolled at a temperature between 500° C. and 700° C. to a plate or slab of about 0.15 inch in thickness. Preferably the slab is hot rolled employing reductions of about 10% with intermittent reheating, if necessary, occurring in an argon atmosphere. Thereafter the slab having a thickness of about .15 inch may be grit blasted, pickled in a suitable pickling solution and thereafter cold rolled to about 0.075 inch in thickness, such cold rolling affecting between about 5% and about 10% reduction in cross sectional area per pass. However, such cold rolling can be continued until up to about 60% total reduction in cross sectional area is performed on zirconium alloys and up to 98% on unalloyed zirconium, undergoing the cold reduction. The material may be subjected to an intermediate heat treatment at any convenient time depending upon the entire cold working schedule and the process of the present invention. The intermediate heat treatment is applied for the purpose of recovering the cold workability of the material and such intermediate heat treatment is preferred between all stages of cold work. The heat treatment takes place at a temperature within the range between the recrystallization temperature and the beta transformation temperature and preferably for a time period of about one hour while in vacuum or a protective atmosphere.

While the cold working with intermediate heat treatments may be accomplished in one or more operations, it is preferred that until the final cold working operation is accomplished, as will be referred to more fully hereinafter, at least one cold working operation and one intermediate heat treatment be effected to the material which is then to be cold worked to finish gauge. The number of cold working operations and intermediate heat treatments are set up in such a manner that the material which is utilized in the process of the present invention will preferably undergo a reduction to a prescribed gauge, which reduction to a prescribed gauge will comprise cold working the material to a gauge such that average beta grain size approaches or exceeds material thickness during the heat treatment of this invention.

While it is preferred to have the maximum amount of cold work effected to the material prior to the final cold reduction with the proper intermediate heat treatments, yet the process of the present invention has been found to be effective in material which has been given just one cold reduction prior to heat treatment in the beta field in the presence of the surface active agent. While the purpose of the intermediate heat treatment is to restore ductility for cold working and to recrystallize the material, nonetheless, the effects of the cold work, that is, prior cold work, and preferably a cold working to prescribed gauge immediately prior to treatment in the beta field is effective for producing a much stronger texture than material which has been given only a small amount of cold work, on intermediate heat treatment followed by treatment employing the process of the present invention.

In the preferred embodiment of the process of the present invention, the material having the required intermediate dimensions is given a final cold working to prescribed gauge. This cold working can take any form, for example, cold rolling, cold drawing etc. Such final stage of cold working should effect at least a 35% reduction in the cross sectional area and reductions of up to about 60% for zirconium alloys and up to about 98% for unalloyed zirconium can be employed and are beneficial for producing strong response to the orientation control induced by the process of the present invention. While cold reductions in excess of 60% can be applied to zirconium alloys and are effective for contributing to the production of the preferred orientation of the present invention, such cold reductions in excess of about 60% may induce problems with respect to edge checking and undue loss of ductility. Outstanding results have been achieved where the cold reduction has been maintained within the range between about 50% and about 60% in cross sectional area, a cold reduction of about 50% being particularly effective for producing strong texture response. In particular it has been found that when such cold rolling to produce flat rolled zirconium and zirconium alloy material, tungsten carbide rolls having a highly polished surface and employing kerosene as a lubricant have been most effective in producing outstanding results.

The cold rolled or recrystallized material of prescribed gauge is then subjected to a heat treatment while in vacuum or a protective atmosphere. Preferably the heat treatment occurs at a temperature above the beta transformation temperature and in practice it has been found that such heat treatment is usually effective where the temperature is maintained within the range between about 900° C. and about 1200° C. During this time, the material of finish gauge dimensions is maintained within the confines of a protective atmosphere. While a vacuum atmosphere is sufficient, such vacuum being less than about $10^{-4}$ torr, nonetheless certain advantageous results may be obtained where a gaseous atmosphere which is inert to the material being heat treated is employed, as will appear more fully hereinafter. Such atmospheres include the inert gases such as helium and argon which have been sufficiently gettered to remove substantially all traces of deleterious substances such as oxygen, nitrogen, water vapor and hydrogen. In this respect it has been found that when annealing in helium it is preferred to employ a sequence of purging and pumping followed by the stabilization of gettered helium, the same to flow at a rate of about 2 cubic feet per hour for a moderately sized furnace until the oxygen content is less than about 1 p.p.m. as continuously monitored on an oxygen gauge. While the zirconium material will be subject to some outgassing nonetheless the helium atmosphere is adjusted so that the oxygen content of the helium atmosphere is maintained at less than about 1 p.p.m. Substantially the same method is employed when argon is used as the protective atmosphere. However when a vacuum atmosphere is employed it is usually accomplished by means of first purging the vacuum chamber with gettered helium and thereafter removing the helium from the heat treatment chamber to establish the vacuum. While success has been obtained when a vacuum of about $10^{-4}$ torr has been employed, nonetheless it is preferred to utilize a vacuum of less than about $5 \times 10^{-6}$ torr with a leak rate of less than about $7 \times 10^{-5}$ torr liters per minute.

During such heat treatment in a protective atmosphere it is necessary to add a surface active agent to the protective atmosphere to affect the surface free energy to provide a preferred orientation to the materials which are undergoing the heat treatment. In particular the surface active agents which have been found most useful in this respect have been the halogen elements and of the halogen elements the element iodine has proved to be of outstanding success. The amount of iodine or other surface active agent, which is employed does not appear to be too critical, nonetheless, so long as significant amounts of the surface active agent is present during the heat treatment, outstanding results are obtained. It has been found that in the case of iodine, concentrations which were found to be effective in both vacuum as well as the helium containing protective atmosphere comprised a partial pressure within the range between $1 \times 10^{-9}$ torr and about $2 \times 10^{-1}$ torr, it being noted that there appeared to be no substantial difference for any value between either ends of the concentration range insofar as the degree of orientation is concerned. It is believed that because of the anisotropy of the surface free energy at the gas metal surface, the addition of the surface active agent promotes the preferred growth of the (110) beta grains. That is to say the (110) beta grains appear to be preferentially grown at this temperature range where the material is heat treated in the manner set forth while under the influence of the surface active agent. Upon subsequent cooling a preferred nucleation of the (0002) grains takes place during allotropic transformation thus producing the outstanding characteristics of the preferred orientation of the present invention. The texture development is greatly intensified where the material has undergone cold work to effect a reduction in cross sectional area of between about 35% and about 60% to prescribed gauge prior to treatment.

As stated hereinbefore it is preferred to conduct such heat treatment in the presence of a protective atmosphere. While a vacuum can be employed nonetheless preferred results are obtained when an inert gas such as helium or argon is used as the protective atmosphere for conducting the surface active agent to the material being heat treated. In this respect when vacuum heat treatment is employed it is feasible to connect the furnace to a flask containing a suitable amount of the surface active agent such as iodine crystals on an easily decomposable halogen containing compound which will not contain a deleterious component. This flask may be previously evacuated and thereafter refrigerated in liquid nitrogen. The vacuum pumping system may be thereafter isolated from the furnace muffle and the flask can be warmed to room temperature. This results in the establishment within the hot zone of the heat treating unit an adequate vapor pressure of the surface active agent. At the end of the annealing period the furnace power is turned off and the materials may be furnace cooled to room temperature while maintaining the partial pressure of the surface active agent.

On the other hand where an inert gas is employed as the protective atmosphere, a predetermined partial pressure of the surface active agent can be established and the protective atmosphere with a desired partial pressure of surface active agent carried thereby can be flowed over the materials undergoing heat treatment. As a result thereof the protective atmosphere acts as a carrier for the surface active agent which is thereby more positively conducted to the surface of the material being heat treated. Even though, as set forth hereinbefore, a wide range of partial pressures of the surface active agent can be employed nonetheless the smaller amounts are preferred especially when the same is suspended in a carrier gas for example helium.

As stated hereinbefore the material is maintained at temperature for time periods of at least one hour. While it may be possible to employ shorter time periods than one hour nonetheless it is preferred to maintain the minimum time at about one hour to assure a maximum response to the heat treatment and surface active agent. Longer time periods can be employed although difficulties such as contamination may be encountered if the time exceeds 48 hours, for example.

Following heat treatment in the manner set forth hereinbefore the material is cooled to a temperature below the allotropic transformation temperature of the material. During such cooling, the material undergoes a transformation from the body centered cubic lattice structure to the closed packed hexagonal structure characteristic of the alpha phase of zirconium and zirconium base alloys. It is during this allotropic transformation that the preferred orientation is obtained that of the (0002) plane being parallel to the surface of the material. In this respect it is noted that this preferred orientation occurs in about 80% or more of the grains by volume, that is, a large volume percent of the grains are oriented so that the basal plane (0002) is within 15° of the surface of the material.

Reference is now directed to FIG. 1 which is a pole figure obtained through X-ray diffraction studies. The pole figure illustrated in FIG. 1 is a (0002) pole figure of crystal bar zirconium sheet which was subjected to a final cold rolling of 56% to produce a sheet of material having a thickness of 0.010 inch. This material was thereafter subjected to a vacuum anneal for a period of one hour at a temperature of 1000° C. which temperature is above the alpha to beta transition temperature. The illustration of FIG. 1 shows a typical structure for material processed in the normal mill manner without the benefit of the process of the present invention. It is noted that there are few (0002) planes oriented within 15° of the sheet surface and many with the (0002) planes tilted between ±30° to 40° about the rolling direction which is customary in materials exhibiting a close packed hexagonal lattice structure with "c" axis to "a" axis ratio less than 1.6.

Figure 2:
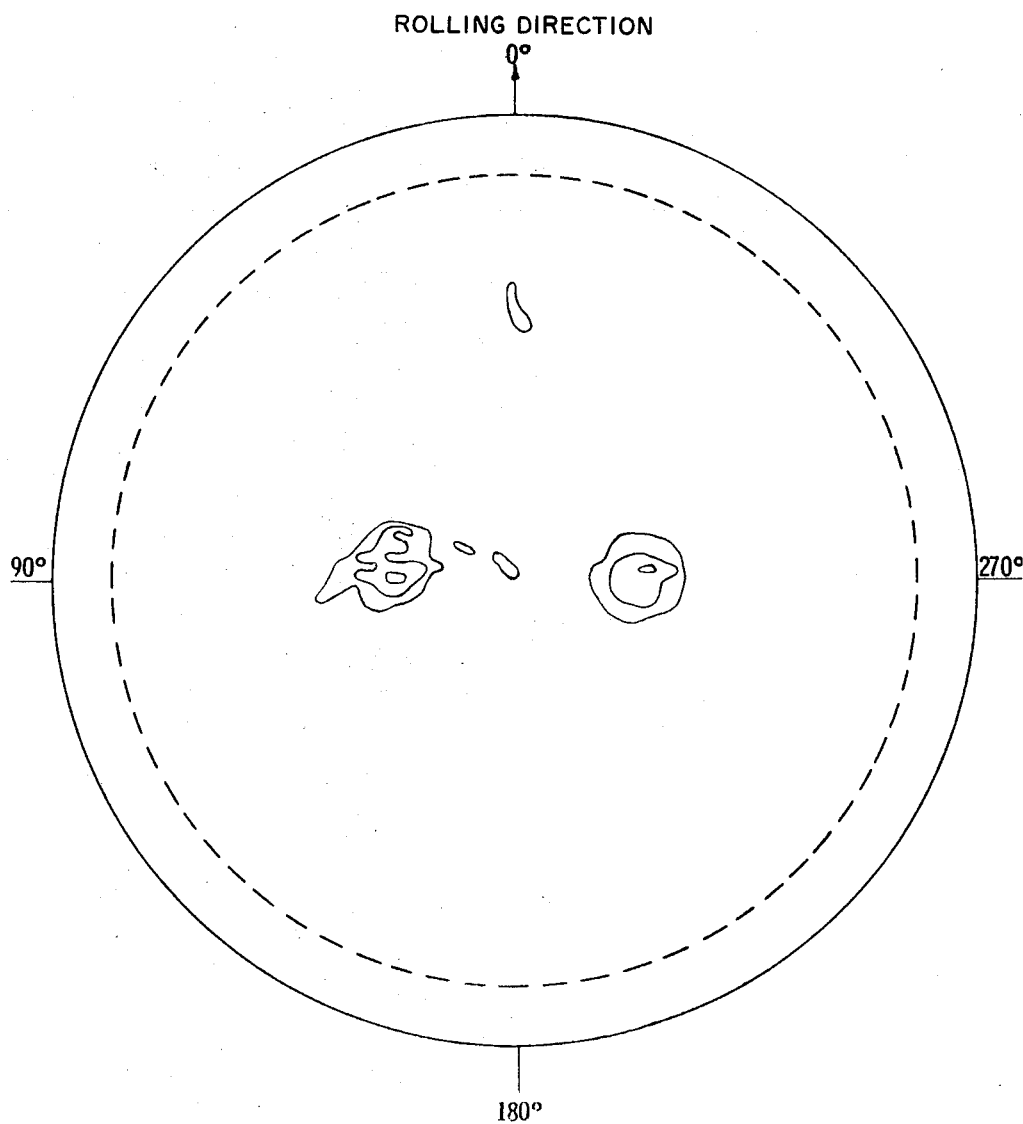
FIG. 2 is a pole figure of sponge zirconium sheet treated in the same manner as the material of FIG. 1. Contour lines show multiples of random intensity 2, 5 and 10.
Figure 3:
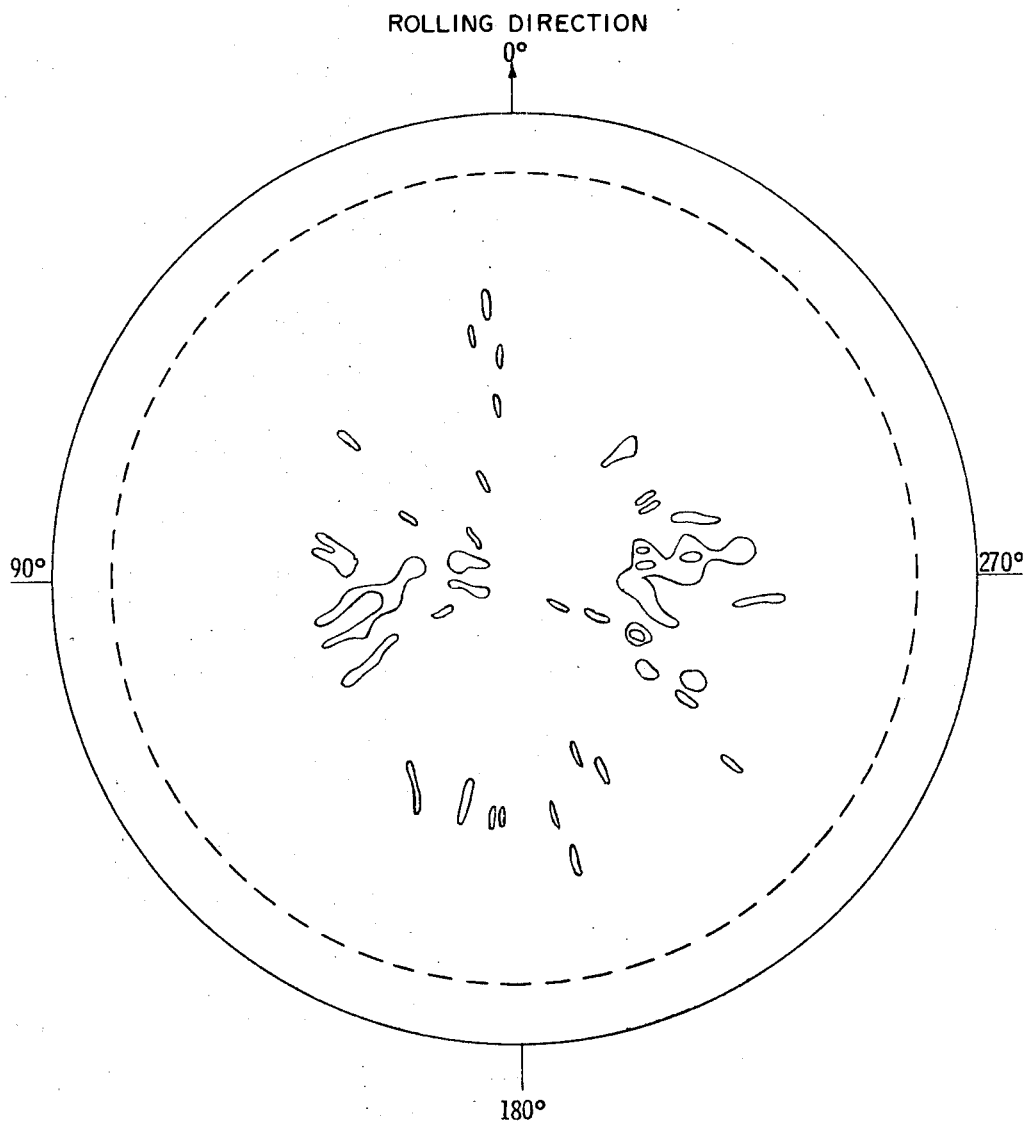
FIG. 3 is a pole figure of zircaloy-4 sheet treated in the same manner as the material of FIGS. 1 and 2. Contour lines show multiples of random intensity 2 and 5.

Referring now to FIG. 2 which is also a (0002) pole figure of sponge zirconium sheet cold rolled 56%, it also has a very small percentage of the basal planes oriented within 15° of the surface of the sheet. While FIG. 3 is a pole figure of zircaloy-4 which was cold rolled 56% and subsequently vacuum annealed one hour at 1000° C. it becomes apparent that there is very little texture intensity with respect to the basal plane and the sheet surface. While the texture of FIG. 1 would appear to be somewhat stronger than the texture illustrated within FIGS. 2 and 3 yet less than about 3.1% of the total volume shows the grain texture which is produced by the process of the present invention. Thus FIGS. 1 through 3 make it clear that the mere cold rolling and mere heat treatment without the employment of the surface active agent is ineffective for producing a strong texture wherein the basal plane (0002) is within 15° of the surface of the sheet.

In order to more clearly demonstrate the success obtained with the process of the present invention reference is directed to the following examples:

EXAMPLE I

Crystal bar stock having the chemical compositions set forth hereinafter in Table I was electron beam melted in a vacuum of less than $5 \times 10^{-5}$ torr. The ingot which was produced was forged to a billet ½ in. x 2½ in. x 21½ in. long. During the forging operation which occurred at a temperature within the range between 800 and 850° C. the ingot was reheated several times in an argon atmosphere. The billet thus produced from the electron beam melted ingot was grit blasted, pickled in 10 parts hydrofluoric acid, 45 parts nitric acid and 45 parts water and thereafter hot rolled to a plate 0.150 inch in thickness.

The hot rolling took place at a temperature in the range between 500 and 700° C. with a reduction of about 10% in cross sectional area per pass being accomplished. The plate was subjected to intermittent reheatings in an argon atmosphere as needed. The plate having a thickness of 0.150 inch was grit blasted, pickled in a solution containing 10 parts hydrofluoric acid, 45 parts nitric acid and 45 parts water and thereafter the plate was subjected to a 50% cold reduction to produce a strip having a thickness of 0.075 inch. The strip was produced in a plurality of

TABLE I.—CHEMICAL ANALYSIS

| Element | Crystal bar stock | Sponge reactor grade 21 ingot analyses (bar) | Analyses of zircaloy-4 | |
|---|---|---|---|---|
| | | | Impurity, p.p.m.: | |
| Al, p.p.m | 25 | 30 | Al | 20 |
| B, p.p.m | 0.2 | 0.2 | B | 0.2 |
| C, p.p.m | 18 | 100 | C | 97 |
| Ca, p.p.m | 15 | | Cd | 0.2 |
| Cd, p.p.m | 0.5 | 0.5 | Co | 10 |
| Co, p.p.m | 5 | 20 | Cr | 20 |
| Cr, p.p.m | 25 | 114 | Hf | 100 |
| Cu, p.p.m | 25 | 22 | Mn | 20 |
| Fe, p.p.m | 100 | 875 | Ni | 35 |
| Hf, p.p.m | 290 | 88 | Si | 30 |
| Mg, p.p.m | 15 | 20 | Ti | 20 |
| Mn, p.p.m | 25 | 20 | U | 1 |
| Mo, p.p.m | 10 | 20 | W | 50 |
| Na, p.p.m | 20 | 20 | | |
| Ni, p.p.m | 36 | 20 | H | 16 |
| Pb, p.p.m | 10 | 20 | N | 39 |
| Si, p.p.m | 25 | 25 | O | |
| Sn, p.p.m | 40 | 20 | | |
| Ti, p.p.m | 25 | 20 | Alloy, percent: | |
| U, p.p.m | 0.1 | | Sn | 1.39 |
| V, p.p.m | 10 | 20 | Fe | 0.21 |
| W, p.p.m | 25 | 20 | Cr | 0.10 |
| Zr, p.p.m | 99.8 | | Cr+Fe | 0.31 |
| Zr+Hf percent | 99.9 | | | |
| H, p.p.m | 9 | | | |
| N, p.p.m | 22 | | | |
| O, p.p.m | 100 | 44 | | | cold working passes and each pass accomplished a 5 to 10% reduction in cross-sectional area. The strip having a thickness of 0.075 inch was prepared for further cold rolling by belt grinding, chemical polishing and recrystallization in a vacuum of less than $5 \times 10^{-5}$ torr for one hour at a temperature of 625° C. Thereafter the material was chemically polished in a solution of 10 parts hydrofluoric acid, 45 parts nitric acid and 45 parts water and cold rolled to thicknesses of 0.030 inch, 0.015 inch and 0.010 inch and 0.005 inch in thickness. Intermediate anneals in a vacuum of less than $5 \times 10^{-5}$ torr for one hour at 625° C. were performed as required on each of the materials so that all materials had a 56% cold reduction to finish gauge regardless of the final thickness. Such cold reductions to finish thickness were accomplished employing highly polished two-inch diameter tungsten carbide work rolls and kerosene was employed as the rolling lubricant.

The cold rolled material was thereafter given a heat treatment at the temperatures selected namely a temperature of 1000° C. for one hour in the case of the material having the pole figure set forth in FIG. 1. In addition other specimens were subjected to the annealing heat treatment in the following manner:

A sequence of purging and pumping was repeated three times which was followed by final evacuation. The materials were held in a boat which was then moved into the furnace hot zone. The temperature of the material rose from room temperature to the annealing temperature in about twenty minutes and from 650° C. to the annealing temperature in less than five minutes. During the annealing period the material temperature was held to within ±5° C. Once the materials attained the desired heat treatment temperature, in the present instance 1000° iodine was evaporated into the system to make contact with the metals in the hot zone during the entire heat treatment operation. The iodine was maintained at a partial pressure of about 0.2 millimeter of mercury. After heat treatment for one hour the material was cooled to room temperature and thereafter subjected to X-ray analysis and the pole figure was plotted to determine the texture development produced by the process of the present invention.

Figure 4:
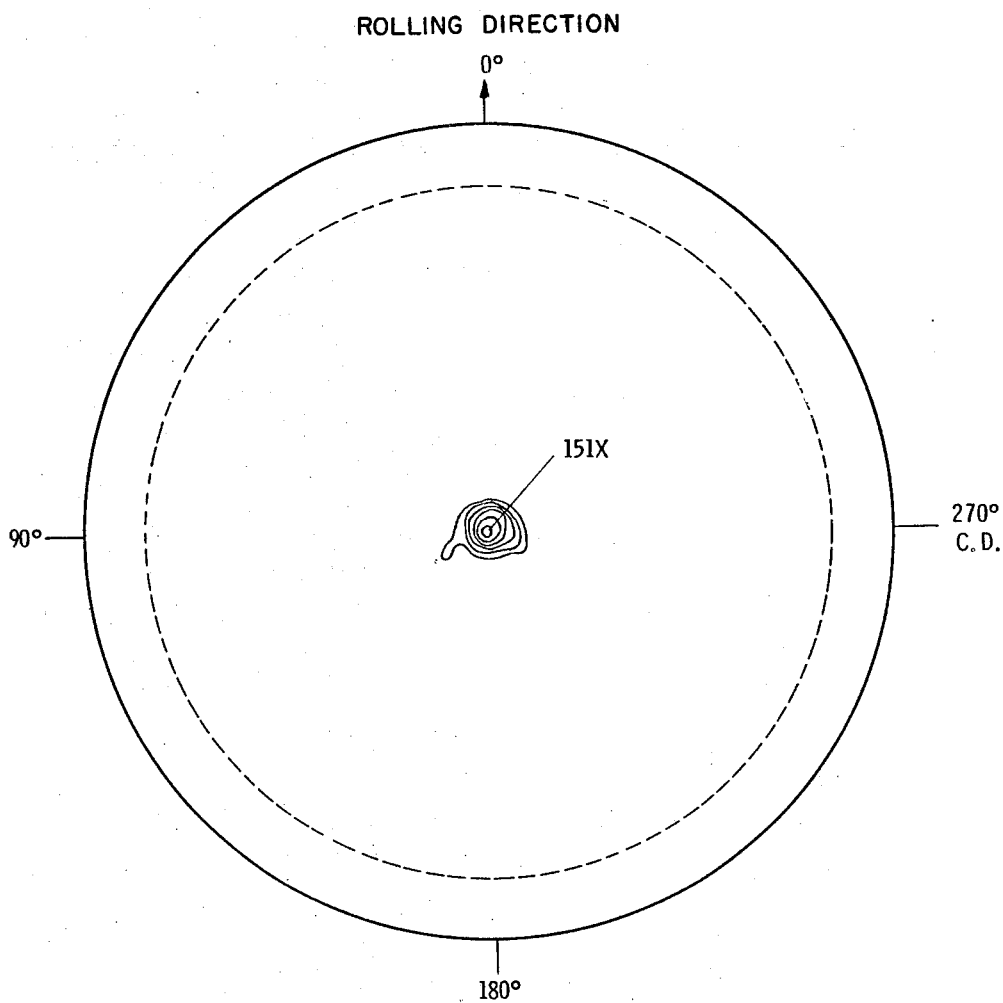
FIG. 4 is a pole figure of crystal bar sheet cold rolled to 0.010 inch and treated in accordance with the process of the present invention. Contour lines show multiples of random intensity 2.5, 7.2, 15.1, 36.7, 65.3, 127.2 and 151.

Reference is directed to FIG. 4 which is a (0002) pole figure of the electron beam melted crystal bar stock zirconium sheet which was cold rolled 56% to 0.010 inch and heat treated as set forth hereinbefore. It can be seen that the orientations of (0002) poles are so concentrated in the central portion of the figure that greater than 86% by volume of the grains have attained an orientation in which the basal (0002), plane is within 15° of the sheet surface. Comparing FIG. 4 with FIG. 1 in which less than 5% of (0002) planes are with 15° of sheet surface it becomes clear that the process of the present invention is highly effective for producing a great degree of preferred orientation in crystal bar zirconium. Similar results were obtained by annealing in a helium atmosphere to which iodine additions were made.

EXAMPLE II

Sponge zirconium, that is, reactor grade 21 zirconium, was employed and melted into the form of a hot rolled bar. This material had the analysis set forth in Table I. The bar was hot rolled at a temperature of 700° C. to 825° C. to a plate having a thickness of 0.150 inch which plate was grit blasted, chemically polished in 10 parts hydrofluoric acid, 45 parts nitric acid and 45 parts water and thereafter cold rolled to 0.075 inch strip. The strip material was prepared for further cold rolling by belt grinding, chemical polishing, and recrystallization in a vacuum of less than $5 \times 10^{-5}$ torr for one hour at a temperature of 625° C. The strip material was then cold rolled from 0.075 to 0.030 inch, 0.015 inch, 0.010 inch and 0.005 inch in thickness. Intermediate anneals in a vacuum of less than $5 \times 10^{-5}$ torr for a period of one hour at 625° were performed at various intermediate stages so that all the sponge zirconium strips were also subjected to a final cold reduction of 56% regardless of the final thickness. Freshly polished two-inch diameter tungsten carbide work rolls were employed for cold rolling the 0.075 inch strip and kerosene was employed as the rolling lubricant.

The sponge zirconium base material in the cold worked condition was subjected to a heat treatment employing iodine atmosphere in vacuum in the same manner as Example I under the same set of conditions. This material upon cooling to room temperature was subjected to X-ray analysis and the pole figures therefore were plotted.

Figure 5:
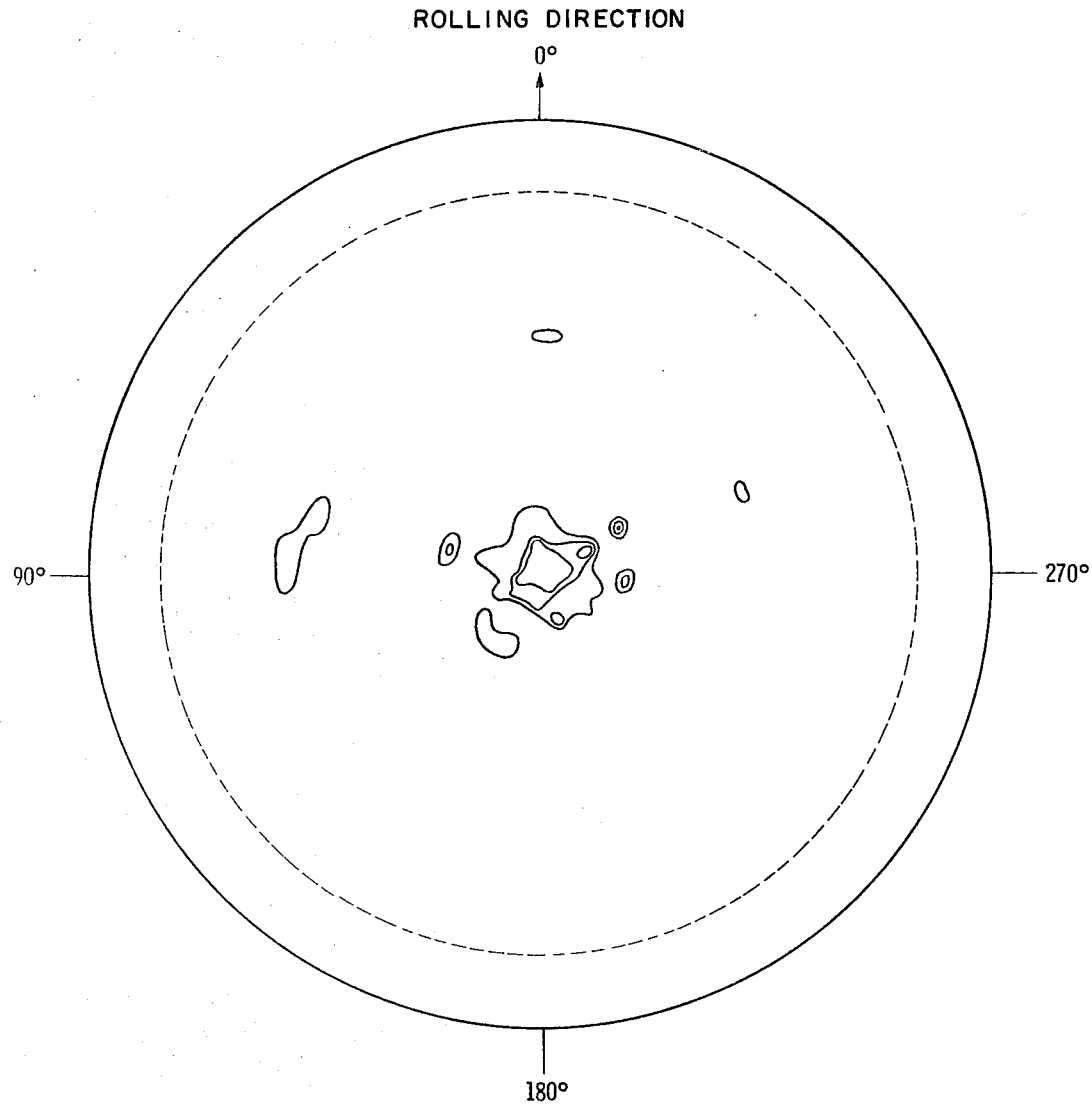
FIG. 5 is a pole figure of sponge zirconium sheet treated in the same manner as the material of FIG. 4. Contour lines show multiples of random intensity of 2.8, 7.8 and 12.6.

Reference is now directed to FIG. 5 which demonstrates the high degree of orientation which has been obtained through the use of the process of the present invention. Comparing the pole figure of FIG. 5 with that of FIG. 2 it is seen that there is a high intensity of the basal plane (0002), being within 15° of the sheet surface or rolling plane. The other texture components designated within the pole figure may be spurious (10T1) reflections and as such do not indicate any high degree of orientation other than the basal plane (0002) being oriented within 15° of the sheet surface.

EXAMPLE III

The process of the present invention is effective for producing the high degree of preferred orientation to commercial sheet material. Zircaloy-4 having the analysis set forth hereinbefore in Table I was employed as the starting material and treated by the process of the present invention. This material in sheet form was received having a thickness of 0.030 inch and was in the mill annealed condition. This material was chemically polished in 10 parts hydrofluoric acid, 45 parts nitric acid and 45 parts water and cold rolled to thicknesses of 0.015, 0.010 and 0.005 inch by the same procedure as described above for the crystal bar and sponge zirconium. Intermediate anneals in vacuum of less than $5 \times 10^{-5}$ torr for one hour at 700° C. were performed as required so that prior cold reductions were 50% for 0.015 inch strip and 56% for the 0.010 inch strip and 56% for the 0.005 inch strip. These materials were given an anneal for one hour at 1000° C. in an iodine containing atmosphere in the same manner as the material of Examples I and II hereinbefore.

Figure 6:
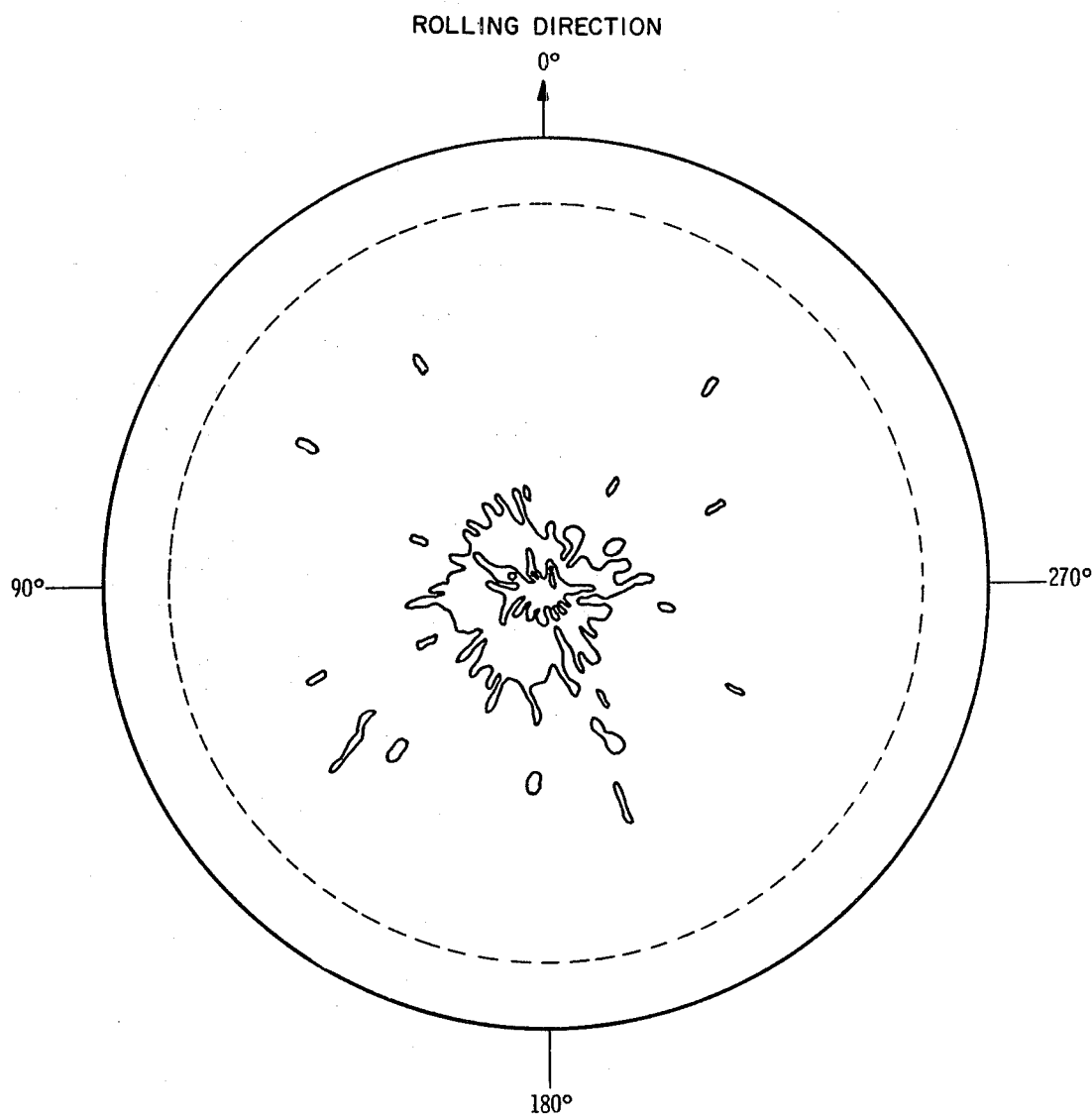
FIG. 6 is a pole figure of zircaloy-4 sheet treated in the same manner as the material of FIGS. 4 and 5. Contour lines show multiples of random intensity 2.8, 11.4 and 27.

Reference is now directed to FIG. 6 which is a pole figure of the material after heat treatment in the manner set forth hereinbefore. It can be seen that there is a very high degree of the (0002) or basal plane within 15° of the rolling plane of the sheet. Compared with FIG. 3 in which 3.3% of (0002) planes lie within 15° of sheet surface it is seen that the process of the present invention is effective for producing an outstanding result.

From the foregoing it is clear that the crystal bar zirconium sheet treated in accordance with the present invention has produced a very strong texture in the alpha phase in which the (0002) plane is within 15° parallel to the rolling plane. This strong transformed alpha texture is believed to result from the anisotropy of surface energy at the gas metal interface which promotes the preferred growth of the (110) beta grains and subsequent preferred nucleation of the (0002) alpha grains during allotropic transformation. The effect of the anisotropy of surface free energy may be influenced by the degree of cold work introduced to the material of finish gauge. In this respect, the texture developed may be improved with cold reductions greater than 35% because of a reduced concentration of surface irregularities with increasing amounts of reduction. The texture of the sponge zirconium sheet was altered from one in which the (0002) poles were tilted up to 40° away from the sheet normal to one in which a large percent by volume were within 15° of the sheet surface resulting from treatment in accordance with the process of the present invention.

As stated the process of the present invention is believed to be effective on grains occupying surface locations in a polycrystalline aggregate. These grains have a surface free energy which depends upon their individual orientations with respect to the surface. Such anisotropy of surface energy provides a selective driving force which imparts a preferential grain growth or nucleation to grains of certain orientation. However the anisotropy of surface energy is greatly enhanced by the action of the particular surface active agents employed in the annealing atmosphere. The interaction such as adsorption or the chemical reaction of the surface active agent with the metal at the gas metal interface is believed to cause the grains of the given orientations to grow or nucleate under the selective driving force of combined surface energy and grain boundary energy. As the selective process proceeds the existing texture of the metal is replaced by new texture which is characteristic of the annealing conditions and a particular surface active agent. Thus when the basal planes of the final alpha close-packed-hexagonal structure are aligned parallel to the sheet specimen surface such alignment constitutes a texture which reduces corrosion and hydride embrittlement, imparts increased strength under suitable stress conditions in nuclear fuel cladding or structural members.

While the process of the present invention has been demonstrated with respect to a flat work product nonetheless the same can be employed utilizing for example extruded tube reduced or drawn tubing to produce a texture in which the poles of the basal plane are distributed radially about the surface thereof. In that particular instance substantially the same parameters as are employed with respect to flat work materials are effective for producing the desired orientation in tubular products as those tubes that are used for nuclear cladded fuels.

In the examples given hereinbefore, only an iodine containing vacuum atmosphere was employed. However similar materials were treated employing a helium atmosphere carrying a surface active agent suspended therein. Similar results were obtained and in some instances the volume percent of the grains exhibiting the preferred orientation was enhanced over comparable specimens treated in iodine containing vacuum atmosphere. Also chlorine, bromine and fluorine can be employed, either individually or in admixtures of two or more elements in the surface active agents.

We claim as our invention:

1. In the process of producing a preferred orientation in the alpha phase of zirconium and zirconium base alloy materials which orientation is characterized by about 80% or more of the grains by volume displaying the basal plane (0002) within 15° of the surface of the material, the steps comprising, heating a cold worked material to a temperature in excess of the beta phase transformation temperature while maintaining said material in a protective atmosphere, introducing at least one element from the group consisting of iodine, chlorine, bromine and fluorine into said protective atmosphere, maintaining said material in this atmosphere in the aforesaid temperature range for a minimum of about one hour to promote the preferred growth of the (110) beta grains and thereafter cooling the material to a temperature below the allotropic transformation temperature to effect preferred nucleation of the (0002) grains.

2. The process of claim 1 in which the material is cold worked to effect a cold reduction to finish gauge of greater than 35%.

3. The process of claim 1 in which the material is heated to a temperature within the range between about 900° C. and 1200° C.

4. The process of claim 1 in which the surface active agent is iodine.

5. The process of claim 1 in which the material is cold worked prior to the final cold working.

6. The process of claim 5 in which said prior cold working is accomplished in one or more steps with intermediate heat treatment.

7. The process of claim 6 in which the intermediate heat treatments take place at a temperature above the recrystallization temperature and below the temperature of the transformation to the beta phase.

8. In the process of producing a preferred orientation in the alpha phase of zirconium and zirconium base alloy materials which orientation is characterized by about 80% or more of the grains by volume having the basal plane (0002) within 15° of the surface, the steps comprising, cold working the material to a prescribed gauge to effect a cold reduction of between about 35% and about 60% in cross sectional area without any intermediate heat treatment, heating the cold reduced material to a temperature within the range between about 900° C. and 1200° C. while maintaining said material in a protective atmosphere, introducing at least one element from the group consisting of iodine, chlorine, bromine and fluorine into said protective atmosphere, maintaining said material in this atmosphere in the aforesaid temperature range for a minimum of about one hour to promote the preferred growth of the (110) beta grains and thereafter cooling the material to a temperature below the allotropic transformation temperature to effect preferred nucleation of the (0002) grain.

9. The process of claim 8 in which the surface active agent is iodine.

10. The process of claim 8 in which the protective atmosphere is helium.

11. The process of claim 8 in which the protective atmosphere is a vacuum of at least $10^{-4}$ torr.

12. The process of claim 8 in which the material is cold worked and heat treated prior to the final cold working.

13. The process of claim 12 in which the prior cold working is accomplished in one or more steps with an intermediate heat treatment before final cold working to finish gauge.

14. The process of claim 13 in which the intermediate heat treatments take place at a temperature above the recrystallization temperature and below the temperature of transformation to the beta phase.

15. The process of claim 8 in which the material is heat treated prior to the final cold reduction to finish gauge.

16. The process of claim 15 in which the heat treatment takes place above the recrystallization temperature and below the temperature of the transformation to the beta phase.

17. In the process of producing an alpha phase structure in zirconium and zirconium base alloy materials characterized by exhibiting a preferred orientation, the steps comprising, selecting a material from the group consisting of zirconium and zirconium base alloys having an equilibrium room temperature alpha phase structure and of thickness such that the average beta grain diameter approaches or exceeds the material thickness dimension, subjecting said material to a heat treatment at a temperature above the recrystallization temperature and below the temperature of transformation to the beta phase, cold working the material to prescribed gauge, heat treating the material of prescribed gauge at a temperature within the range between the beta transformation temperature and about 1200° C. while maintaining said material in an atmosphere of helium, introducing into the helium atmosphere sufficient iodine to maintain a partial pressure of iodine within the range between about $1\times10^{-9}$ torr and about $2\times10^{-1}$ torr, maintaining the material in said atmosphere and at said elevated temperature for at least one hour, and thereafter cooling the material to a temperature below the allotropic transformation temperature, said material being characterized by exhibiting an orientation in which about 80% or more of the grains by volume display the basal plane (0002) within 15° of the surface, improved strength, ductility, oxidation resistance and hydride resistance.

18. A zirconium base alloy article characterized by an all alpha phase microstructure derived from a beta grain structure, the article having a thickness of less than the average beta grain diameter and having a preferred grain orientation such that at least 80% by volume of the basal (0002) planes are oriented to within 15° of the article surface.

References Cited

UNITED STATES PATENTS

| 2,894,866 | 7/1959 | Picklesimer | 148—11.5 |
| 3,152,929 | 10/1964 | Wiener et al. | 148—113 X |
| 3,276,903 | 10/1966 | Galmiche | 148—13.1 X |

CHARLES N. LOVELL, Primary Examiner

U.S. Cl. X.R.

148—6.3, 20.3, 32, 133